3,421,947
ORGANIC CHARGE TRANSFER SOLUTION BATTERY

Norvell E. Wisdom, Jr., Elizabeth, and Eric O. Forster, Scotch Plains, N.J., assignors to Esso Research and Engineering Company, a corporation of Delaware
No Drawing. Filed Sept. 2, 1966, Ser. No. 576,838
U.S. Cl. 136—100                                6 Claims
Int. Cl. H01m 17/02

ABSTRACT OF THE DISCLOSURE

A battery having as an electrolyte a solution of molecular halogen in an amine solvent, an anode of an electropositive metal which dissolves into said solution and a chemically inert cathode has been found to be an effective system for the production of electrical energy.

---

This invention relates to the discovery of a new class of electric cells or batteries consisting essentially of an electropositive metal anode, an inert cathode, and a solution of iodine or other halogen in pyridine or other suitable amine solvent as a charge transfer solution.

For an amine to serve as a suitable solvent, it should be an organic liquid which dissolves the halogen as neutral molecules and forms therewith a solution that does not spontaneously react with or dissolve the electropositive metal anode. The amine preferably should dissolve the reaction product formed by reaction of the halogen with metal dissolved in the amine-halogen solution when electrons are removed from the anode in a circuit which outside the cell conducts the electrons back to the cathode which conducts the electrons into the solution.

Electropositive metals are those metals higher than hydrogen in the E.M.F. or electromotive force series of elements because they have a tendency to form positive ions in aqueous solution with removal of the charge from the hydrogen ions in an aqueous solution. In this reaction, a negative charge is given up to the bulk of the active metal, which then acts as an anode conducting anodic current by removal of electrons therefrom if another electrode acting as a cathode in the solution returns the negative charge to positive ions, e.g., $H^+$ ions moving into contact with the cathode. Problems encountered with the use of aqueous solutions as electrolytes in a battery are the tendency of the metal ions to form insoluble products which adhere to the anode, thus lowering its solution action, the tendency of the positive ions to form a localized concentration or a layer on the cathode, thus repelling positive ions in what is known as polarization, and the generation of gas layers which obstruct contact of an electrode with the solutions. Accordingly, batteries that use aqueous electrolytes give a diminishing voltage.

An object of the present invention is to provide a battery system with a voltage that is more suitably close to constant for a relatively long period, preferably a suitably high voltage and suitably high current.

A system consisting of an active electropositive metal electrode and an inert electrode immersed in a solution of halogen in a suitable liquid organic amine has been found to function as an electric battery. The active electropositive metal serving as the anode is selected from among the following: Li, K, Ba, Sr, Ca, Na, Mg, Al, Zn, Cd, Sn and any other such metal not belonging to the class of metals forming passive films such as the noble metals, the iron group metals, chromium, and vanadium.

The organic solution should be as concentrated as possible to produce a minimum internal resistance. In general, its conductivity should be of the order of $10^{-5}$ (ohm cm.)$^{-1}$ or higher with a range of $10^{-4}$ to $10^{-2}$ or higher preferred. The solvent should be of the amine type preferentially of the tertiary heterocyclic amine type, with pyridine the most preferred material. Other amines indicated to be suitable as the solvent are mainly tertiary and secondary amines, such as piperylene, piperidine, pyrollidine, tetramethylethylene diamine. The ring compounds may also have a hydrocarbon substituent group, e.g. 3-picoline.

The solute should be selected from the halogen family and pseudo-halogens with iodine the preferred material. The invention is illustrated by the following results:

TABLE I

| Anode | Cathode | Charge transfer solution | Voltage |
|---|---|---|---|
| Magnesium | Platinum | Pyridine/iodine | 1.6 |
| Tin | do | do | 1.0 |
| Zinc | do | do | 0.65 |
| Aluminum | do | do | 0.40 |

The specific working of this invention can be illustrated by the following sample of a cell operating under an external load. The electrolyte contained 220 gm. of iodine per liter of pyridine. A magnesium electrode (surface area 5 cm.$^2$) facing a platinum electrode of similar surface area at 5 mm. distance from each other, immersed in the above-identified electrolyte delivered approximately 15 milliamperes through a 100 ohm resistance for several hours. Similar results were obtained from a tin-platinum cell except that the current was 7 milliamps and surface area less than 3 cm.$^2$.

Instead of the inert platinum electrode, use can be made of carbon or metals other than platinum which are also preferably inactive towards spontaneous dissolution by the charge transfer halogen-amine solution.

The preferred anodes for the cells or batteries using the halogen-amine solution in combination therewith for high voltage are the metals at least as high as tin in the electromotive series, including magnesium, cadmium, zinc, aluminum, alloys and amalgams of such metals. These metals have standard oxidation potentials in the range of 0.14 to 3.05 measured under standardized conditions at 25° C. with reference to hydrogen-hydrogen ion as a zero potential couple.

The preferred active metal anodes evidently form with the halide ion complexes which remain dissolved in the amine solvent, i.e., complexes which are not precipitated.

Battery systems employing the described halogen-amine solutions are useful where a dependable voltage is desired in a circuit and where low variation in current is desired.

The cells described are kept free of oxygen, water or other such substances with no gaseous decomposition product formed to be removed or accumulated. Thus, these cells function with remarkable regularity.

The mechanism of how the cells operate is difficult to give in all details but the operation can be regarded to involve the formation of halide ions from the molecular halogen dissolved in the amine solvent by addition of electrons from the cathode. The liquid amine solvent may act to transfer the electrons toward the anode in an unusual manner, i.e., without depending on slow migration of charged particles through the solution, so that the positive metal ions from the anode quickly form the halide complexes as the positive metal ions are formed. Thus, the electric current (electrons) in effect is transferred through the amine-halogen solution from the cathode to the anode and is conducted externally of the cell from the active anode back into the passive cathode which conducts the current back into the solution.

What is claimed is:
1. An electric battery, in combination therewith an amine solution of molecular halogen, an electropositive metal anode which dissolves into said solution when elec- trons are removed from the anode and a chemically inert cathode, said solution being in contact with the anode and cathode to transfer an electric current through the solution from the cathode to the anode.

2. A battery set forth in claim 1, said anode containing a metal of the group lithium, sodium, potassium, calcium, barium, magnesium, strontium, zinc, aluminum, cadmium, and tin, the halogen in the amine solution being iodine, and the cathode being a conductor of electricity which does not react with the solution.

3. A battery set forth in claim 1, said amine solution having a conductivity of more than $10^{-5}$ (ohm cm.)$^{-1}$.

4. A battery set forth in claim 1, said amine solution being a solution of a halogen in a liquid amine which dissolves a reaction product formed by reaction of the halogen with metal dissolved from the anode when electrons are removed from the anode and electrons are conducted by the cathode into the solution.

5. An electric battery set forth in claim 1, the amine solution being a pyridine solution of iodine, the electropositive metal in the anode being selected from magnesium, tin, zinc, and aluminum.

6. An electric battery, in combination therewith a magnesium anode spaced from a chemically inactive cathode in a charge transfer pyridine solution of molecular iodine.

References Cited

UNITED STATES PATENTS

| | | | |
|---|---|---|---|
| 2,597,453 | 5/1952 | Coleman et al. | 136—100 |
| 3,043,896 | 7/1962 | Herbert et al. | 136—6 |
| 3,098,770 | 7/1963 | Horowitz et al. | 136—100 |
| 3,185,590 | 5/1965 | Mayer et al. | 136—6 |
| 3,248,265 | 4/1966 | Herbert | 136—100 |

WINSTON A. DOUGLAS, *Primary Examiner.*

C. F. LE FEVOUR, *Assistant Examiner.*

U.S. Cl. X.R.

136—155, 102